United States Patent [19]

Chain et al.

[11] 4,325,666
[45] Apr. 20, 1982

[54] MATERIALS HANDLING DEVICE

[76] Inventors: Franklin O. Chain, Rte. 1, Box 40; John P. Myers, Box 193, both of Oakwood, Okla. 73568

[21] Appl. No.: 146,451

[22] Filed: May 5, 1980

[51] Int. Cl.$^3$ .................... A01D 87/12; B60P 1/34
[52] U.S. Cl. ............................ 414/24.5; 414/471; 414/501; 414/540; 414/546; 414/728; 414/785
[58] Field of Search ............... 414/24.5, 24.6, 471, 414/540, 541, 546, 501, 728, 742, 785

[56] References Cited

U.S. PATENT DOCUMENTS

| | | | |
|---|---|---|---|
| 2,308,648 | 1/1943 | DeVry et al. | 414/728 |
| 4,023,690 | 5/1977 | Goode | 414/24.5 |
| 4,128,179 | 12/1978 | Gilbert | 414/24.5 |
| 4,182,590 | 1/1980 | Harkness | 414/24.5 |
| 4,253,786 | 3/1981 | Harkness | 414/24.5 |

Primary Examiner—Leslie J. Paperner
Attorney, Agent, or Firm—Dunlap & Codding

[57] ABSTRACT

A materials handling device suitable for mounting on a structure, such as a pickup truck, so that heavy materials, such as cylindrical bales of hay, can be selectively loaded and unloaded onto the pickup truck for transportation from one location to another. The materials handling device comprises a housing assembly pivotally connected to the support structure so that the housing assembly is substantially vertically disposed adjacent an edge of the support structure; a frame slideably positioned within the housing assembly; a material engaging assembly mounted on the lower end portion of the frame so as to extend in a direction away from the support structure; and a frame and housing actuator assembly disposed between and interconnecting the support structure and the upper end portion of the frame. The actuator assembly, which is pivotally connected to the frame and the support structure, selectively moves the frame between a vertically lowered position and the vertically raised position. When the frame is in the vertically raised position the actuator assembly selectively moves the housing assembly between the vertically disposed position and a horizontally disposed position wherein the housing assembly, and thus the frame, are disposed on the support structure. The materials handling device further includes a cradle assembly pivotally connected to the support structure so as to be substantially aligned with the housing and the frame, and a cradle actuator assembly disposed between and pivotally connected to the support structure and the cradle assembly.

51 Claims, 11 Drawing Figures

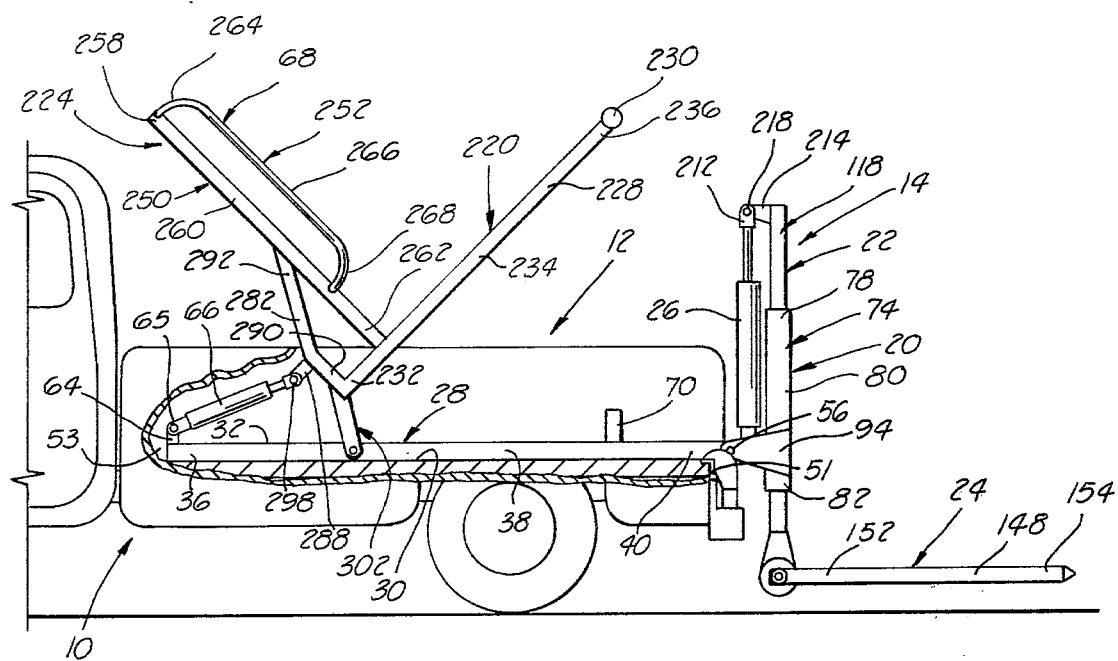
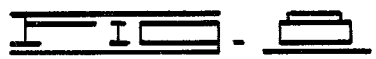
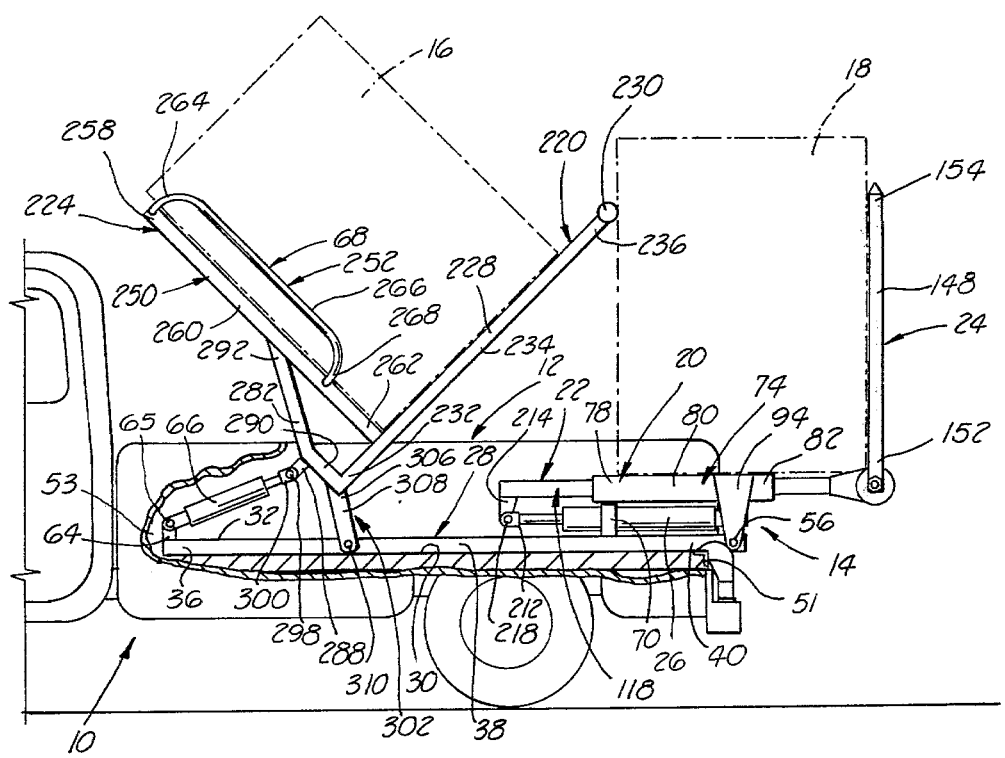
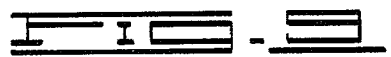

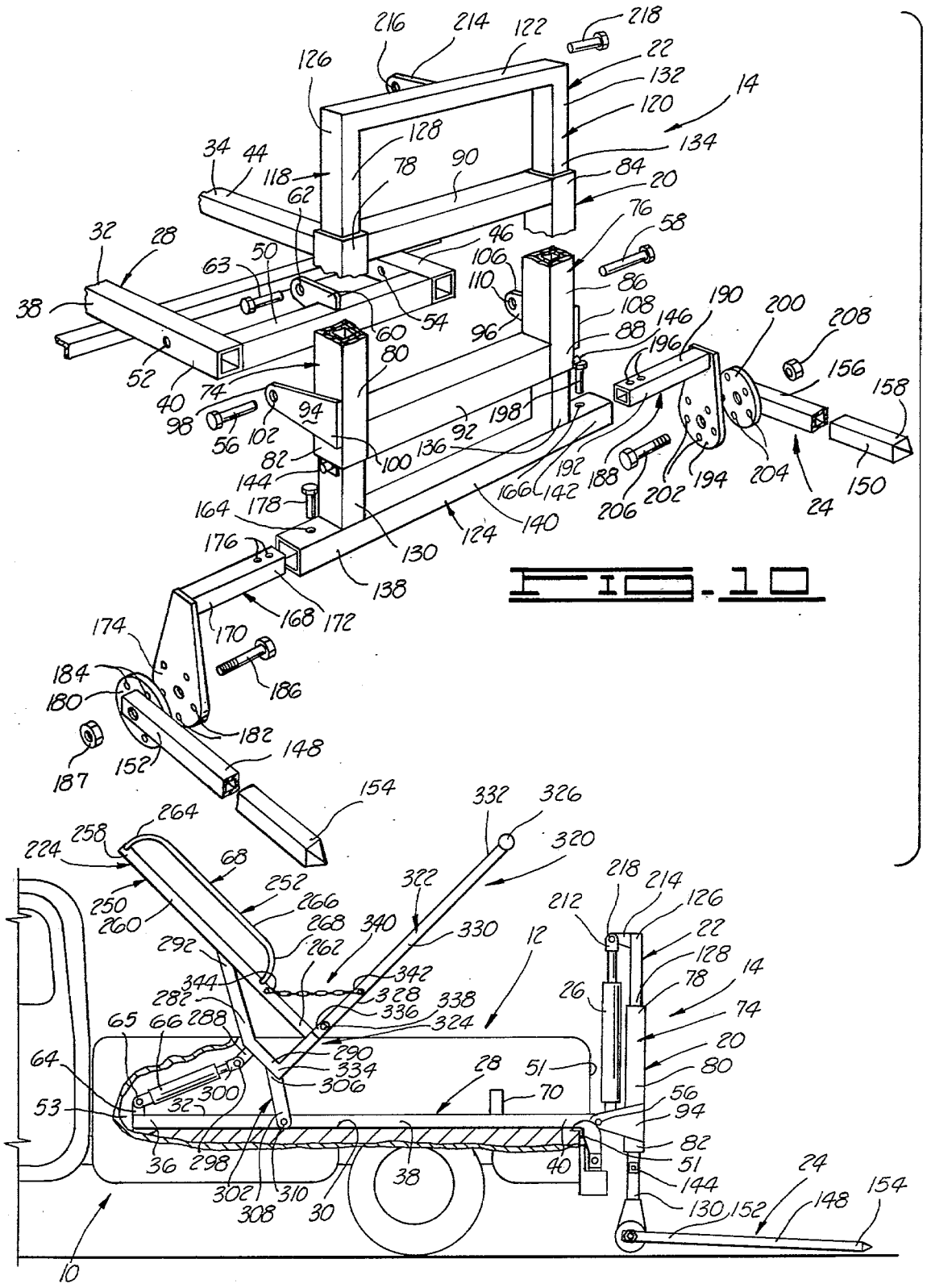

MATERIALS HANDLING DEVICE

BACKGROUND OF THE INVENTION

This invention relates to material handling devices for selectively loading and unloading material on a support structure, and more particularly, but not by way of limitation, to a material handling device for selectively loading and unloading large cylindrical bales of hay in the box of a pickup truck.

DESCRIPTION OF THE PRIOR ART

With increasing emphasis on fuel economy and raw material conservation, it is becoming more important to avoid duplication of vehicles whenever possible. For example, in a farming operation, implements have been developed for producing cylindrical bales of hay in which the tiers are circumferential. Such bales are relatively enormous in size and weight and cannot be efficiently handled by individuals. Numerous types of implements have heretofore been proposed for use in the loading and transporting the cylindrical bales of hay. Certain of these implements have been self-contained units, while others have been employed with a tractor, a truck, or the like. The use of the before-mentioned self-contained units are expensive and require the purchase of an implement having no use except to bale and/or transport hay. While others have proposed hay loading and transporting implements for use with tractors, trucks, and the like, such implements are generally complex in structure, expensive to fabricate, often required special modifications to the vehicle, such as the truck bed, and special tools and equipment for attaching or removing the implement from the vehicle. Thus, a need has long existed for an improved material handling device for selectively loading and unloading material onto a support structure, such as the large cylindrical bales of hay onto the box of a pickup truck, which is economical to manufacture, durable in construction, and which can readily be removed without the use of expensive auxiliary equipment and specialized tools. Further, it is highly desirable that such a materials handling device be capable of loading more than one of the large cylindrical bales into the box of the pickup and to cooperate in securing same thereon when the bales of hay are being moved from one location to another.

SUMMARY OF THE INVENTION

An object of the present invention is to provide a materials handling device adapted to be mounted on a supporting structure so that materials can be selectively loaded and unloaded on the structure.

Another object of the invention is to provide a materials handling device which can be positioned within the box of a pickup truck and employed for selectively loading and unloading material into same.

Another object of the invention is to provide a materials handling device which can be readily removed from the box of the pickup truck without specialized tools and equipment.

Another object of the invention is to provide an improved loading device for selectively loading and unloading cylindrical bales of hay onto a pickup truck which does not suffer from the disadvantages of the prior art devices.

Another object of the invention is to provide an improved materials handling device for loading and unloading cylindrical bales of hay on a pickup truck which is economical to manufacture, durable in construction, and which can be operated from the cab portion of the pickup truck.

These and other objects, advantages and features of the present invention will be apparent to those skilled in the art from a reading of the following detailed description when read in conjunction with the drawings which accompany this disclosure an with the appended claims.

The above objects are accomplished by the materials handling device of the present invention which is designed for mounting on a support structure, such as a pickup truck, so that heavy materials, such as cylindrical bales of hay, can be selectively loaded and unloaded onto the pickup truck for transportation of same from one location to another. Broadly, the materials handling device comprises a housing assembly pivotally connected to one edge portion of the support structure so that the housing assembly is substantially vertically disposed adjacent the edge of the support structure; a frame slideably positioned within the housing assembly; a material engaging assembly mounted on the lower end portion of the frame so as to extend in a direction away from the support structure; and a frame and housing actuator assembly disposed between and interconnecting the support structure and the upper end portion of the frame. The actuator assembly, which is pivotally connected to the frame and the support structure, selectively moves the frame between a vertically lowered position and the vertically raised position. When the frame is in a vertically raised position the actuator assembly selectively moves the housing assembly between the vertically disposed position and a horizontally disposed position wherein the housing assembly, and thus the frame, are disposed on the support structure. The materials handling device of the present invention further includes a cradle assembly pivotally connected to the support structure so as to be substantially aligned with the housing and the frame, and a cradle actuator assembly disposed between and pivotally connected to the support structure and the cradle assembly. The cradle assembly is selectively moved by the cradle actuator assembly between a lowered first position and a raised second position. In the lowered first position the cradle assembly is adapted to receive the housing assembly, the frame, and the actuator assembly when same are in the horizontally disposed position so that material supported thereon can be transferred to the cradle assembly; whereas in the raised second position the cradle is elevated above the support structure in a direction away from the housing and the frame so that the cradle assembly does not interfere with the movement of the frame and the housing assembly between the horizontal position and the vertical position.

BRIEF DESCRIPTION OF THE DRAWING

FIG. 8 is a partially broken, side elevational view of a portion of a pickup truck having the materials handling device of the present invention mounted in the box thereof, the housing assembly being illustrated in the vertically raised position, the cradle assembly being illustrated in the raised second position.

FIG. 9 is a partially broken, side elevational view of a portion of a pickup truck having the materials handling device of the present invention secured in the box thereof, the housing assembly and frame of the device being illustrated in a horizontal position in the box of the pickup truck such that the material engaging assembly secured a bale of hay on the rearward portion of the box of the pickup truck, the cradle assembly illustrated in the raised second position and securing a bale of hay on the forward portion of the box of the pickup truck.

FIG. 10 is a partially broken, exploded perspective view illustrating the housing assembly, the frame, and the materials engaging means of the materials handling device of the present invention, and further illustrating the pivotable attachment of same to the base support of the device for securing same in the box of the pickup truck.

FIG. 11 is a partially broken, side elevational view of a portion of a pickup having the improved materials handling device of the present invention positioned within the box thereof and illustrating a second embodiment of the cradle assembly, the cradle assembly being disposed in the raised second position, the housing assembly and frame being depicted in the vertically lowered position.

DETAILED DESCRIPTION OF PREFERRED EMBODIMENTS

Figure 1:
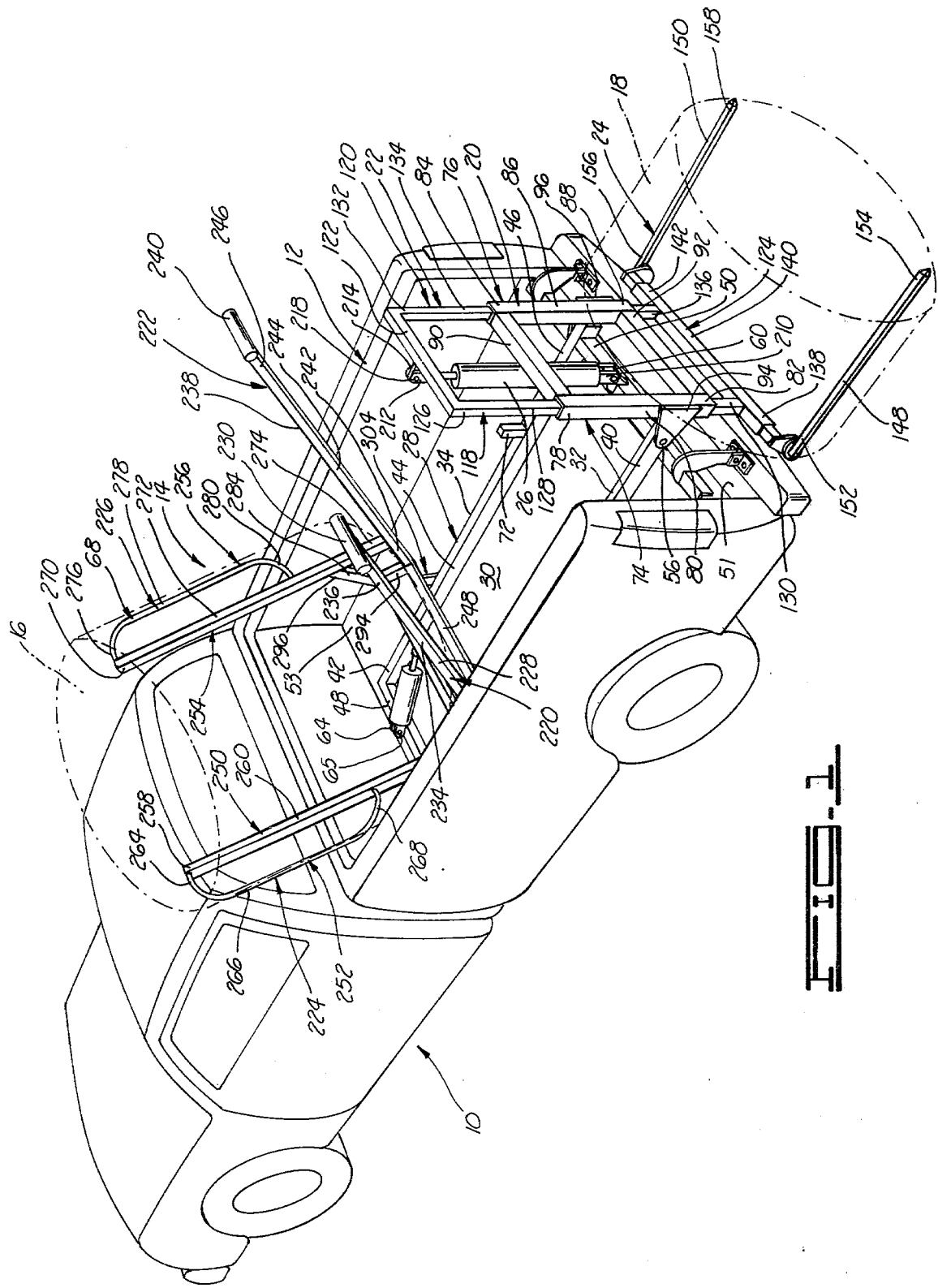
FIG. 1 is a perspective view of a pickup truck having the improved materials handling device of the present invention mounted in the box thereof, the housing assembly and frame thereof being illustrated in the vertically lowered position, the cradle assembly being illustrated in the raised second position.

Referring now to the drawings in which like numerals are employed to designate like parts throughout same, and particularly to FIGS. 1-9, and 11, a pickup truck 10 having a bed or box 12, hereinafter referred to as the bed 12, is depicted. The tailgate of the pickup truck 10 has been removed and a materials handling device 14 of the present invention is secured in the bed 12 of the pickup truck 10. The materials handling device 14 selectively loads and unloads material onto the bed 12 of the pickup truck 10, such as cylindrical bales of hay, 16, 18 as depicted in phantom in FIGS. 1 and 9.

The materials handling device 14 comprises a housing assembly 20, a frame 22, a material engaging assembly 24, and a frame and housing actuator, such as a hydraulic ram 26, for selectively moving the frame 22 and the housing assembly 20. The materials handling device 14 is secured in the bed 12 of the pickup truck 10 via a support frame 28. The support frame 28 is disposed adjacent to and secured to a lower supporting surface 30 of the bed 12 of the pickup truck 10. The support frame 28 can be permanently secured within the bed 12 of the pickup truck 10, or the support frame 28 can be detachably secured therein so that upon removal of the support frame 28 and the materials handling device 14 from the bed 12 of the pickup truck 10 the load carrying capacity of the bed 12 is not permanently reduced.

The support frame 28 comprises a first side member 32 and a parallel, spatially disposed second side member 34. The first side member 32, an elongated member, is provided with a first end 36, a medial portion 38, and an opposed second end 40. The second side member 34, an elongated member, is likewise provided with a first end 42, a medial portion 44, and an opposed second end 46. A first cross support member 48 is disposed between and connected to the first ends 36, 42 of the first and second side members 32, 34, respectively; and a second cross support member 50 is disposed between and connected to the opposed second ends 40, 46 of the first and second side members 32, 34 respectively, such that the support frame 28 is provided with a rectangular configuration.

Figure 5:
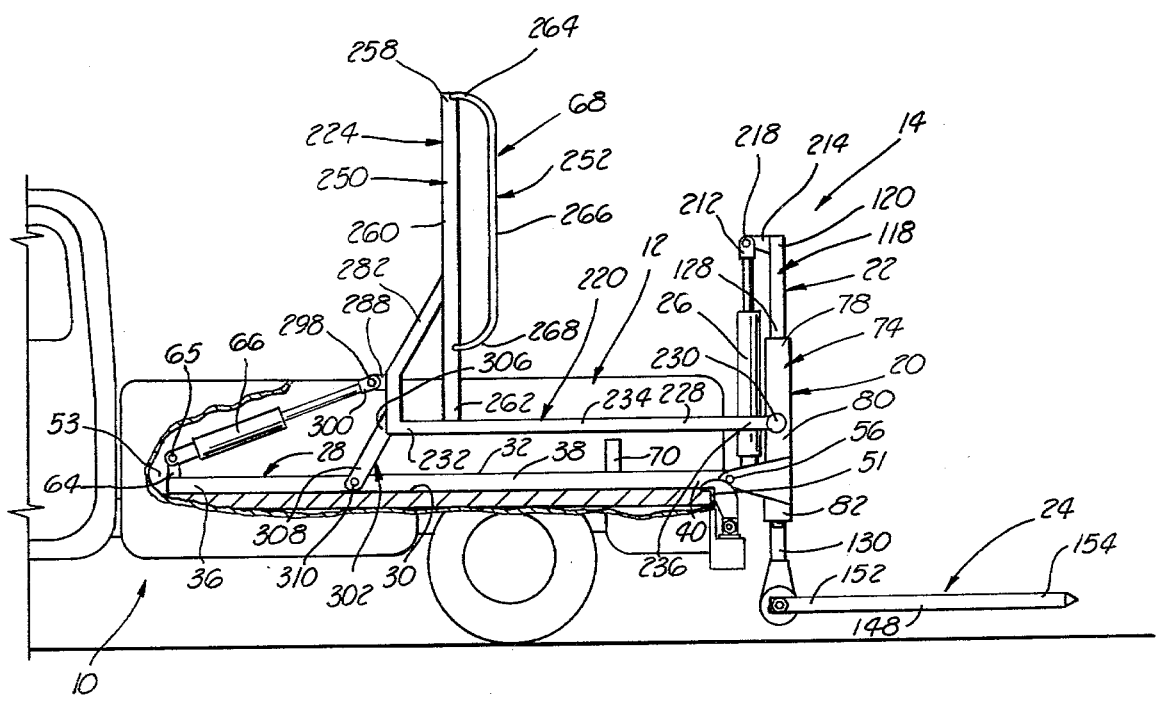
FIG. 5 is a partially broken, side elevational view of a portion of a pickup truck having the materials handling device of the present invention positioned within the box thereof, the housing assemby and frame of the device being illustrated in the vertically raised position the cradle assembly being illustrated in the lowered first position.
Figure 6:
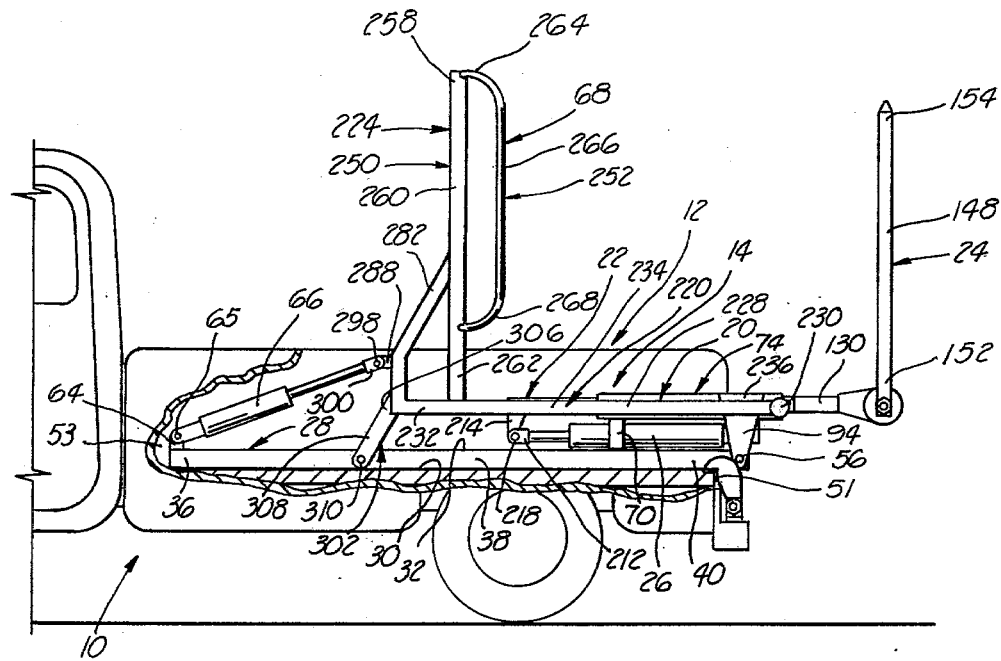
FIG. 6 is a partially broken, side elevational view of a portion of a pickup truck having the materials handling device of the present invention positioned within the box thereof, the housing assembly and the frame of the device being illustrated in a horizontal position in the box of the pickup truck, the cradle assembly being illustrated in the lowered first position and receiving the housing assembly at the frame.
Figure 7:
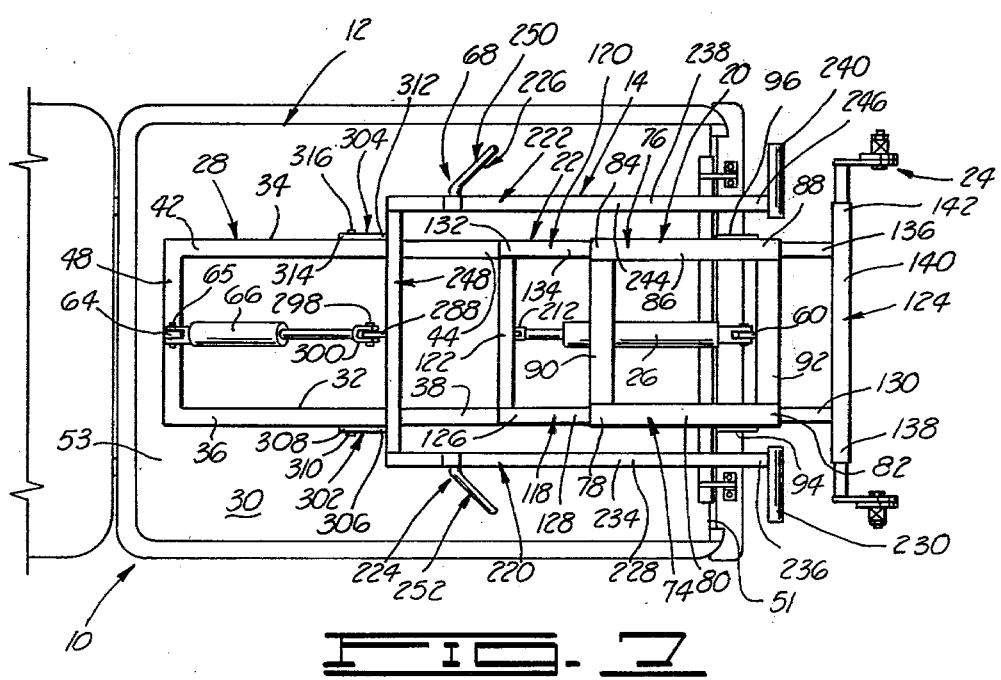
FIG. 7 is a plan view of a portion of a pickup truck having the materials handling device of the present invention positioned within the box thereof, the housing assembly and the frame of the device being illustrated in the horizontal position with the box of the pickup truck, the cradle assembly being illustrated in the lowered first position and receiving the housing assembly and the frame.

The support frame 28 is positioned within the bed 12 of the pickup 10 such that the opposed second ends 40, 46 of the first and second side members 32, 34, and the second cross support member 50 secured therebetween, are positioned substantially adjacent a rearward end portion 51 of the bed 12 of the pickup truck 10; and the first ends 36, 42 of the first and second side members 32, 34, respectively, and thus the first cross support member 48 secured therebetween, are positioned near a forward end portion 53 of the bed 12 of the pickup truck 10 substantially as shown in FIGS. 1-3, 5-9, and 11. Further, the first and second side members 32, 34 of the support frame 28 are maintained a sufficient distance apart via the first and second cross support members 48, 50 so that the housing assembly 20, the frame 22, and the hydraulic ram 26 of the materials handling device 14 can be positioned therebetween when same are moved to a horizontally disposed position as illustrated in FIGS. 6, 7 and 9.

The first and second side members 32, 34 of the support frame 28 are each provided a bore 52, 54, respectively, near their opposed second ends 40, 46 substantially as shown in FIG. 10. The bores 52, 54 in the opposed second ends 40, 46 of the first and second side members 32, 34, are aligned and each is adapted to receive a pivot pin, such a pivot pins 56, 58, so that the housing assembly 20 of the material handling device 14 can be pivotally connected to the opposed second ends 40, 46 of the support frame 28 as will be discussed in more detail hereinafter.

A post 60 (see FIGS. 1, 4, 7 and 10) is mounted in a central portion on the second cross support member 50 so as to extend upwardly therefrom. The post 60 is provided with a bore 62 extending therethrough which is adapted to receive a pin 63 so that one end of the hydraulic ram 26 can be pivotally connected to the support frame 28 (via the second cross support member 50, the post 60 and the pin 63) and the second end of the hydraulic ram 26 can be connected to the frame 22 as will be described hereinafter.

A post 64 (see FIGS. 1–3, 5–9, and 11) is mounted on a central portion of the first cross support member 48 of the support frame 28 so as to extend in an upwardly direction therefrom. The post 64 is provided with a bore (not shown) which is adapted to receive a pin 65 so that one end of a cradle actuator, such as a hydraulic ram 66, can be pivotally connected to the support frame 28 (via the first cross support member 48, the post 64 and the pin 65) and a second end of the hydraulic ram 66 can be connected to a cradle assembly 68 as will be described in more detail hereinafter.

Figure 2:
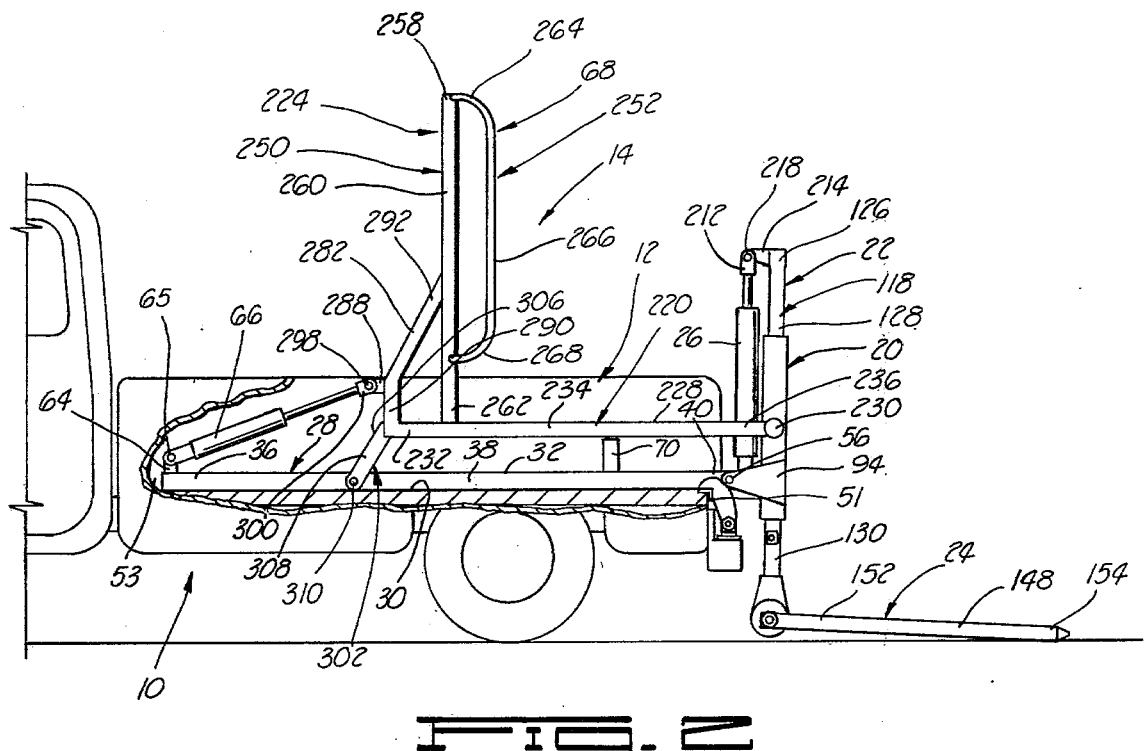
FIG. 2 is a partially broken, side elevational view of a portion of a pickup truck having the materials handling device of the present invention secured in the box thereof, the housing assembly and frame of the device being illustrated in the vertically lowered position, the cradle assembly being illustrated in the lowered first position.
Figure 3:
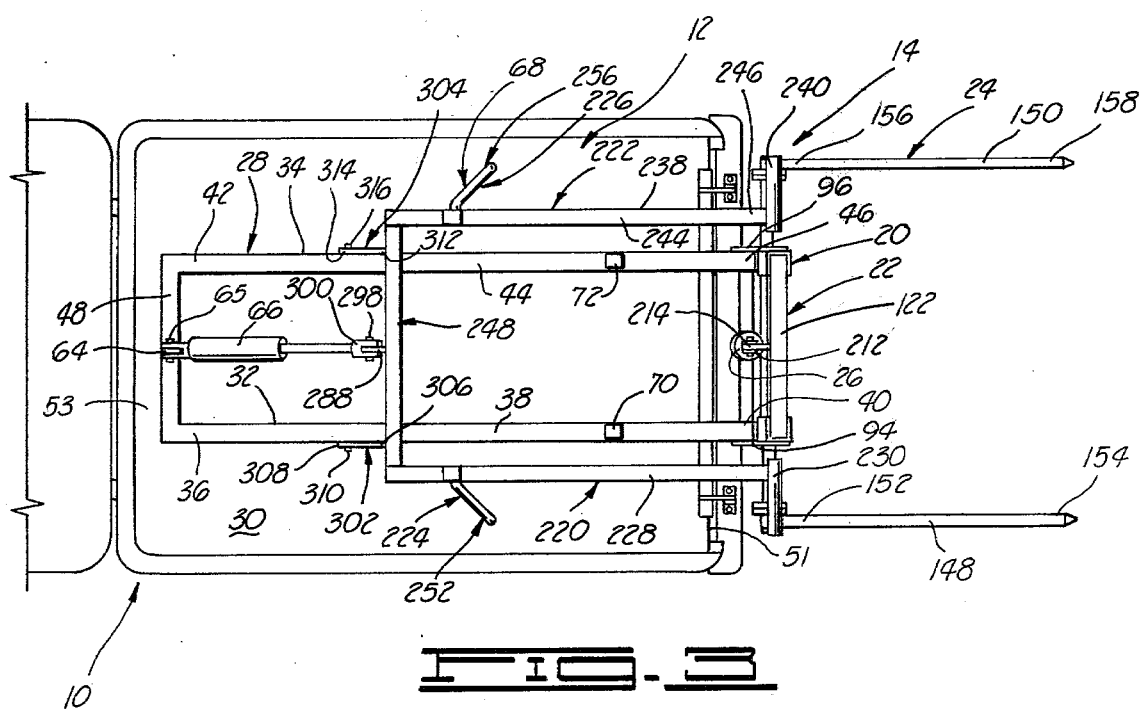
FIG. 3 is a plan view of a portion of a pickup truck having the materials handling device of the present invention positioned within the box thereof, the housing assembly and frame of the device being illustrated in the vertically lowered position, the cradle assembly being illustrated in the lowered first position.

The first and second side members 32, 34 of the support frame 28 are provided with cradle support members 70, 72, respectively, for supporting the cradle assembly 68 when the cradle assembly 68 is in a lowered first position as depicted in FIGS. 2, 3, and 5–7. The cradle support member 7 is secured to the first side member 32 of the support frame 28 a selected distance from the opposed second end 40 thereof (substantially as shown in FIGS. 2, 3, 5, 6, 8, 9 and 11). The cradle support member 72 is secured to the second side member 34 of the support frame 28 a selected distance from the opposed second end 46 thereof (substantially as shown in FIGS. 1 and 3). Preferably, the cradle support member 70 mounted on the first side member 32 of the frame support 28, and the cradle support member 72 mounted on the second side member 34 of the support frame 28 are positioned so as to be oppositely disposed.

As more clearly shown in FIGS. 1, 4, 7, and 10 the housing assembly 20 of the materials handling device 14 comprises a first tubular member 74, and a parallel, spatially disposed second tubular member 76. The first tubular member 74, an elongated member, is provided with a first end 78, a medial portion 80, and an opposed second end 82. The second tubular member 76 is likewise provided with a first end 84, a medial portion 86, and an opposed second end 88. A first cross support member 90 is disposed between and secured to the first ends 78, 84 of the first and second tubular members 74, 76, respectively; and a second cross support member 92 is disposed between and secured to the opposed second ends 82, 88 of the first and second tubular members 74, 76, respectively. Thus, the housing assembly 20 is provided with a substantially rectangular shaped configuration.

As more clearly shown in FIG. 10, the housing assembly 20 further comprises a first plate member 94 and a second plate member 96. The first plate member 94 is depicted as a triangular shaped member having a first end portion 98 and a second end portion 100. The second end portion 100 of the first plate member 94 is connected to the first tubular member 74 of the housing assembly 20 near the opposed second end 82 such that the first end portion 98 of the first plate member 94 extends from the first tubular member 74 of the housing assembly 20 in a direction substantially perpendicular to the elongated axis of the first tubular member 74. An aperture 102 is provided in the first end portion 98 of the first plate member 94. The aperture 102 of the first plate member 94 can be aligned with the bore 52 disposed near the opposed second end 40 of the first side member 32 of the support frame 28 so that the pivot pin 56 can be disposed therein to pivotally connect the first tubular member 74 of the housing assembly 20 to the opposed second end 40 of the first side member 32 of the support frame 28.

The second plate member 96, also depicted as a triangular shaped member, is provided with a first end portion 106 and a second end portion 108. The second end portion 108 of the second plate member 96 is connected to the second tubular member 76 of the housing assembly 20 such that the first end portion 106 of the second plate member 96 extends from the second tubular member 76 of the housing assembly 20 in a direction substantially perpendicular to the elongated axis of the second tubular member 76 and in the same direction as the first end portion 98 of the first plate member 94. The first end portion 106 of the second plate member 96 is provided with an aperture 110. The aperture 110 of the second plate member 96 can be aligned with the bore 54 disposed near the opposed second end 46 of the second side member 34 of the support frame 28 so that the pivot pin 58 can be disposed therein to pivotally connect the second tubular member 76 of the housing assembly 20 to the opposed second end 46 of the second side member 34 of the support frame 28.

By pivotally connecting the housing assembly 20 of the materials handling device 14 to the support frame 28 as described above, the housing assembly 20 is disposed substantially adjacent the rearward end portion 51 of the bed 12 of the pickup truck 10. Further, the housing assembly 20 is movable between a first position (wherein the housing assembly 20 is substantially vertically disposed in a position substantially adjacent the rearward end portion 51 of the pickup truck 10 as depicted in FIGS. 1–5, 8 and 11) and a second position (wherein the housing assembly 20 is substantially horizontally disposed on the bed 12 of the pickup truck 10 as shown in FIGS. 6, 7 and 9).

The frame 22 of the materials handling device 14 is operably connected to the housing assembly 20 so that the frame 22 is slideably positioned therein and selectively movable between a vertically lowered position (as depicted in FIGS. 2 and 11) and a vertically raised position (as depicted in FIGS. 1, 5, and 8). The frame 22 comprises a first side member 118, a substantially parallel, spatially disposed second side member 120, a first cross support member 122, and a second cross support member 124. The first side member 118, an elongated member which is positionable within the first tubular member 74 of the housing assembly 20, is provided with a first end portion 126, a medial portion 128, and a second end portion 130. The second side member 120, an elongated member which is positionable within the second tubular member 76 of the housing assembly 20, is provided with a first end portion 132, a medial portion 134, and a second end portion 136.

The first cross support member 122 is disposed between and connected to the first end portions 126, 132 of the first and second side members 118, 120, respectively. The second cross support member 124 is an elongated member having a first end portion 138, a medial portion 140, and an opposed second end portion 142. The second cross support member 124 is secured to the second end portions 130, 136 of the first and second side members 118, 120 of the frame 22 via the medial portion 140 thereof such that the first end portion 138 of the second cross support member 124 extends a distance outwardly from the first side member 118, and the opposed second end portion 142 of the second cross support member 124 extends a distance outwardly from the second side member 120 substantially as shown in FIG. 10. Thus, the frame 22 is selectively movable within the housing assembly 20 between the vertically lowered position (wherein the movement of the frame 22 can be limited by the first cross support member 122 engaging the first ends 78, 84 of the first and second tubular members 74, 76 of the housing assembly 28) and the vertically raised position (wherein the movement of the frame 22 can be limited by the second cross support member 124 engaging the opposed second ends 82, 88 of the first and second tubular members 74, 76 of the housing assembly 28.) The movement of the frame 22 with respect to the housing assembly 20 of the materials handling device 14 can also be limited in the downward direction by the second cross support member 124 of the frame 22 engaging a surface, such as the ground, on which the material to be loaded onto or from the pickup truck 10 is positioned.

It may be desirable in certain instances for the operator of the materials handling device 14 to selectively restrict the upward vertical movement of the frame 22 with respect to the housing assembly 20 of the materials handling device 14. Such can be accomplished by providing a plurality of bores (not shown) in the second end portion 130 of the first side member 118 of the frame 22, and a plurality of bores (not shown) in the second end portion 136 of the second side member 120 of the frame 122. The bores (not shown) in the first side member 118 of the frame 22 are selectively alignable with the bores (not shown) in the second side member 120 of the frame 22 so that when it is desirable to limit the upward vertical movement of the frame 22 with respect to the housing assembly 20, a pin 144 can be positioned within a selected bore (not shown) in the second end portion 130 of the first side member 118, and a pin 146 can be positioned within an aligned bore (not shown) in the second end portion 136 of the second side member 120 (see FIGS. 4, 10 and 11). Thus, the upward vertical movement of the frame 22 with respect to the housing assembly 20 can be selectively limited by engagement of the pins 144, 146 with the opposed second ends 82, 88 of the first and second tubular member 74, 76, respectively, of the housing assembly 20.

The material engaging assembly 24 of the materials handling device 14 is mounted on the second cross support member 124 of the frame 22 via the first and opposed second end portions 138, 142 of the second cross support member 124 so that the material engaging assembly 24 extends rearwardly from the second cross support member 124, and thus the bed 12 of the pickup truck 10, substantially as shown in FIGS. 1–3, 5, 8 and 11.

Referring more specifically to FIGS. 1, 3 and 10 the material engaging assembly 24 of the materials handling device 14 comprises a first arm 148 and a substantially parallel, spatially disposed second arm 150. The first arm 148, an elongated member, is provided with a first end 152 and an opposed second end 154. The second arm 150, also an elongated member, is provided with a first end 156 and an opposed second end 158. The first end 152 of the first arm 148 is secured to the first end portion 138 of the second cross support member 124 of the frame 22 such that the first arm 148 extends rearwardly from the pickup truck 10. The second arm 150 is connected to the opposed second end portion 142 of the second cross support member 124 of the frame 22 such that the second arm 150 extends rearwardly from the pickup truck 10 and substantially parallel to the first arm 148.

In order to facilitate the loading and unloading of various types of materials (such as the hay bale 16, onto or from the bed 12 of the pickup truck 10) it is desirable that the first and second arms 148, 150 of the material engaging assembly 24 be adjustable in both width and pitch with respect to the frame 22 of the materials handling device 14. The desired adjustability of the first and second arms 148, 150 of the material engaging assembly 24 can readily be accomplished using a combination of elements illustrated in FIG. 10.

Referring now to FIG. 10, the second cross support member 124 of the frame 22, a tubular member, is provided with an aperture 164 in the first end portion 138, and an aperture 166 in the opposed second end portion 142. A telescoping member 168, having a first end 170 and a second end 172, is connected to a reinforcing plate 174 via the first end 170 thereof such that the elongated axis of the telescoping member 168 is substantially perpendicular to the plane of the reinforcing plate 174. The second end 172 of the telescoping member 168, which is positionable within the first end portion 138 of the second cross support member 124, is provided with a plurality of bores 176. The bores 176 in the second end 172 the telescoping member 168 are selectively alignable with the aperture 164 in the first end portion 138 of the second cross support member 124 when the telescoping member 168 is positioned in the first end portion 138 of the second cross support member 124 so that a pin 178 can be positioned therein to secure the telescoping member 168 to the first end portion 138 of the second cross support member 124. Thus, the telescoping member 168, in combination with the first end portion 138 of the second cross support member 124, enables one to selectively adjust the length of the second cross support member 124 of the frame 22.

The first arm 148 of the material engaging assembly 24 is connected to the first end portion 138 of the second cross support member 124 via the telescoping member 168 and the reinforcing plate 174. However, since it is desirable to selectively adjust the pitch of the first arm 148 with respect to the second cross support member 124 of the frame 22, a reinforcing plate 180 is secured to the first end 152 of the first arm 148 such that the reinforcing plate 180 can be disposed adjacent and connected to the reinforcing plate 174 of the telescoping member 168. The desired pitch adjustment of the first arm 148 can be accomplished by providing a plurality of apertures 182 around the peripheral edge portion of the reinforcing plate 174, and a plurality of apertures 184 around the peripheral edge portion of the reinforcing plate 180. When the reinforcing plates 174, 180 have been positioned in an abutting relationship, and the apertures 182, 184 of the reinforcing plates 174, 180, respectively, have been aligned, a plurality of bolts, such as bolt 187, can be positioned through the aligned apertures 182, 184 of the reinforcing plates 174, 180 and secured therein by a locking member, such as nut 186, so that the first arm 148 of the material engaging assembly 24 can be secured in the desired position with respect to the frame 22 of the materials handling device 14.

To provide for the desired width and pitch adjustment of the second arm 150 of the material engaging assembly 24 a telescoping member 188, having a first end 190 and a second end 192, is connected to a reinforcing plate 194 via the first end 190 thereof such that the elongated axis of the telescoping member 188 is substantially perpendicular to the plane of the reinforcing plate 194. The second end 192 of the telescoping member 188, which is positionable within the opposed second end portion 142 of the second cross support member 124, is provided with a plurality of bores 196. The bores 196 in the second end 192 of the telescoping member 188 are selectively alignable with the aperture 166 in the opposed second end portion 142 of the second cross support member 124 when the telescoping member 188 is positioned in the opposed second end portion 142 of the second cross support member 124 so that a pin 198 can be positioned therein to secure the telescoping member 188 to the opposed second end portion 142 of the second cross support member 124. Thus, the telescoping member 188, in combination with the opposed second end portion 142 of the second cross support member 124, enables one to selectively adjust the length of the second cross support member 124 of the frame 22.

The second arm 150 of the materials handling device 14 is connected to the opposed second end portion 142 of the second cross support member 124 via the telescoping member 188 and the reinforcing plate 194. However, since it is desirable to selectively adjust the pitch of the second arm 150 with respect to the second cross support member 124 of the frame 22, a reinforcing plate 200 is secured to the first end 156 of the second arm 150 such that the reinforcing plate 200 can be disposed adjacent and connected to the reinforcing plate 194 of the telescoping member 188. The desired pitch adjustment of the second arm 150 can be accomplished by providing a plurality of apertures 202 around the peripheral edge portion of the reinforcing plate 194, and a plurality of apertures 204 around the peripheral edge portion of the reinforcing plate 200. When the reinforcing plates 194, 200 have been positioned in an abutting relationship, and the selected apertures 202, 204 of the reinforcing plates 194, 200, respectively, have been aligned, a plurality of bolts, such as bolt 206, can be positioned through the aligned apertures 202, 204 of the reinforcing plates 194, 200 and secured therein by a locking member, such as a nut 208, so that the second arm 150 of the material engaging assembly 24 can be secured in the desired position with respect to the frame 22 of the materials handling device 14.

Figure 4:
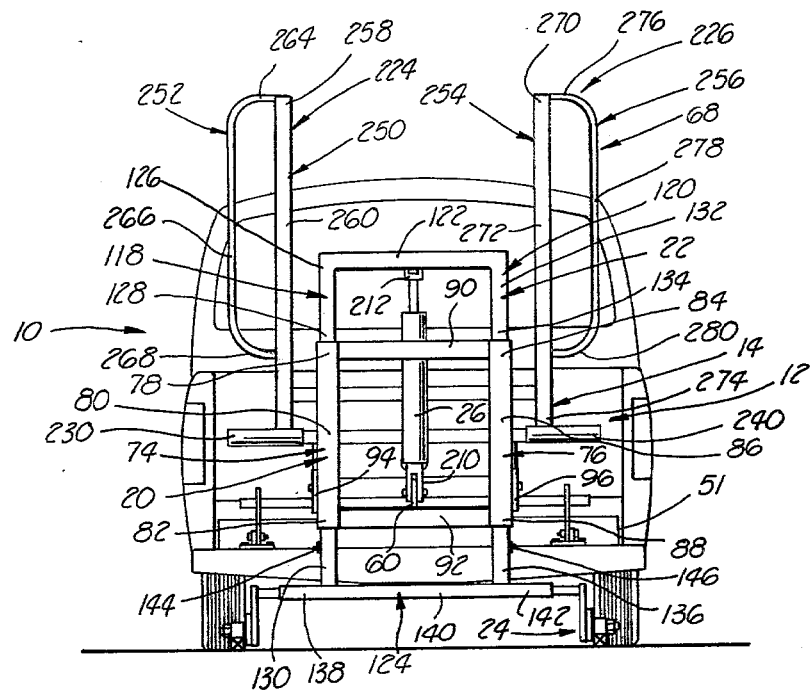
FIG. 4 is a rear view of a pickup truck having the materials handling device of the present invention positioned within the box thereof, the housing assembly and frame of the device being illustrated in the vertically lowered position, the cradle assembly being illustrated in the lowered first position.

As previously set forth, the frame and housing actuator, such as the hydraulic ram 26, is disposed between and connected to the second cross support member 50 of the support frame 28 and the first cross support member 122 of the frame 22 such that upon activation of the hydraulic ram 26 the frame 22 is movable within the housing assembly 20 between the vertically lowered position (as depicted in FIGS. 2, 4, and 11) and the vertically raised position (as depicted in FIGS. 1, 5 and 8). When the frame 22 has been selectively moved (via activation of the hydraulic ram 26) to the vertically raised position in the housing assembly 20 further activation of the hydraulic ram 26 selectively moves the housing assembly 20 (and thus the frame 22 and the material engaging assembly 24) between the first position wherein the housing assembly 20 is substantially vertically disposed adjacent the rearward end portion 51 of the bed 12 of the pickup truck 10, and the second position wherein the housing assembly 20 (and thus the frame 22 and material engaging assembly 24) are disposed on the bed 12 of the pickup truck 10.

The hydraulic ram 26 can be any suitable hydraulic actuator which is operably connected to a hydraulic source (not shown) for providing hydraulic fluid flow to the hydraulic ram 26 via hydraulic hoses (not shown). Hydraulic rams are well known in the art, as well as their connection to a hydraulic fluid source via hydraulic hoses. Thus, no further description of the hydraulic ram 26 or its connection to a fluid source is believed necessary herein.

The hydraulic ram 26 can be connected to the post 60 on the second cross support member 50 of the support frame 28 via a clevis 210 disposed on one end (the base end) of the hydraulic ram 26. The clevis 210 is provided with a pair of axially aligned bores (not shown). Thus, when the clevis 210 is positioned on the post 60 of the second cross support member 50 of the support frame 28, and the bores (not shown) in the clevis 210 of the hydraulic ram 26 are aligned with the bore 62 in the post 60, the pin 63 can be positioned through the aligned bores (not shown) of the cleavis 210 and the bore 62 of the post 60 to pivotally connect the base end of the hydraulic ram 26 to the second cross support member 50 of the support frame 28.

In order to connect the other end of the hydraulic ram 26 to the first cross support member 122 of the frame 22 the outwardly extending end portion of the reciprocating rod of the ram 26 is provided with a clevis 212 having a pair of axially aligned bores (not shown). A post 214 having a bore 216 disposed therein (see FIG. 10) is secured to the first cross support member 122 of the frame 22 in a central portion thereof such that the post 214 extends substantially perpendicular from the first cross support member 122 in the direction of the second cross support 50 of the support frame 28 disposed in the bed 12 of the pickup truck 10. The post 214 is mounted on the first cross support member 122 of the frame 22 so as to be aligned with the post 60 mounted on the second cross support member 50 of the support frame 28. The clevis 212 on the end position of the reciprocating rod of the ram 26 is positioned on the post 214 of the first cross support member 122 so that the bores (not shown) in the clevis 212 of the hydraulic ram 26 are aligned with the bore 216 in the post 214. A pin 218 can then be positioned through the aligned bores (not shown) of the clevis 212 and the bore 216 of the post 214 to pivotally connect the hydraulic ram 26 to the first cross support member 122 of the frame 22.

The interconnection of the frame 22 with the support frame 28 via the hydraulic ram 26 as described above enables the operator of the pickup truck 10 to activate the hydraulic ram 26 from the cab of the pickup truck 10 so that the frame 22, and thus the first and second arms 142, 144 of the material engaging assembly 24, can be selectively moved between the vertically lowered position and the vertically raised position. Further, the interconnection of the frame 22 and the support frame 28 via the hydraulic ram 26 enables the operator, upon further activation of the hydraulic ram 26, to move the housing assembly 20, (and thus the frame 22 and the material engaging assembly 24) from the vertically raised position wherein same are disposed substantially adjacent the rearward end portion 51 of the bed 12 of the pickup truck 10 to the second position wherein the housing assembly 20, the material frame 22, and the hydraulic ram 26 are substantially horizontally disposed on the bed 12 of the pickup truck 10. The movement of the housing assembly 20 from the substantially vertically disposed position to the horizontal position can be accomplished as a continuous motion by activation of the hydraulic ram 26 because of the pivotal connection of the housing assembly 20 to the support frame 28 and the pivotal connection of the hydraulic ram 26 to the support frame 28 and the frame 22.

Referring again to FIGS. 1-9, the materials handling device 14 further comprises the cradle assembly 68 and a cradle actuator, such as the hydraulic ram 66. The cradle assembly is pivotally connected to the first and second side members 32, 34 of the support frame 28 such that the cradle assembly 68 is aligned with the housing assembly 20 and the frame 22 of the materials handling device 14 and adapted to receive same when the housing assembly 20, the frame, and the hydraulic ram 26 are substantially horizontally disposed on the bed 12 of the pickup truck 10.

The hydraulic ram 66 is disposed between and pivotally connected to the first cross support member 48 of the support frame 28 and the cradle assembly 68 such that upon activation of the hydraulic ram 66 the cradle assembly 68 is moved between a lowered first position (as shown in FIGS. 2-7) and a raised second position (as shown in FIGS. 1, 8, 9 and 10). When the cradle assembly 68 is in the lowered first position the cradle assembly is supported by the cradle support members 70, 72 secured to the first and second side members, 34, 32 of the support frame 28. Further, when the cradle assembly 68 is positioned in the lowered first position the cradle assembly 68 is adapted to receive the load, such as the hay bale 16, from the material engaging assembly 24 when the housing assembly 20, the frame 22 and the material engaging assembly 24 have been moved to the position wherein same are substantially horizontally disposed on the bed 12 of the pickup truck 10 as illustrated in FIGS. 6 and 7. In addition, the positioning and pivotable attachment of the cradle assembly 68 to the first and second side members 32, 34 of the support frame 28 enables the housing assembly 20, the frame 22, and the hydraulic ram 26 of the materials handling device 14 to be unrestrictively moved from the position wherein same are disposed on the bed 12 of the pickup truck 10 to the substantially vertically disposed position adjacent the rearward end 51 of the bed 12 of the pickup truck 10 when the cradle assembly 68 is in the raised second position.

The cradle assembly 68 comprises a first load support assembly 220, a parallel, spatially disposed second load support assembly 222, a first upwardly extending assembly 224, and a parallel, spatially disposed second upwardly extending assembly 226. The first load support assembly 220, comprises an elongated member 228 and a substantially normally disposed end member 230. The elongated member 228 of the first load support assembly 222 is provided with a first end 232, a medial portion 234, and an opposed second end 236. The end member 230 of the first load support assembly 220 is secured to the opposed second end 236 of the elongated member 228 such that the longitudinal axis of the end member 230 is substantially normal to the elongated axis of the elongated member 228.

Similarly, the second load support assembly 222 comprises an elongated member 238 and a substantially normally disposed end member 240. The elongated member 238 of the second load support assembly 222 is provided with a first end 242, a medial portion 244, and an opposed second end 246. The end member 240 of the second load support assembly 222 is secured to the opposed second end 246 of the elongated member 238 such that the longitudinal axis of the end member 240 is substantially normal to the elongated axis of the elongated member 238.

A cross support assembly 248 interconnects to the first ends 232, 242 of the elongated members 228, 238 of the first and second load support assemblies 220, 222, respectively. Thus, the first load support assembly 220, the second load support assembly 220 and the cross support assembly 248 form a load supporting structure having a U-shaped configuration substantially as shown in FIGS. 1, 3, and 7.

The first upwardly extending assembly 224 of the cradle assembly 68 comprises an elongated member 250 and a rail member 252; and the second upwardly extending assembly 226 of the cradle assembly 68 comprises an elongated member 254 and a rail member 256. The elongated member 250 of the first upwardly extending assembly 224 is provided with a first end 258, a medial portion 260, and an opposed second end 262. The opposed second end 262 of the elongated member 250 of the first upwardly extending assembly 224 is connected to the medial portion 234 of the first elongated member 228 of the first load support assembly 220, near the first end 232 thereof, so that the elongated member 250 of the first upwardly extending assembly 224 is disposed substantially perpendicular to the elongated member 228 of the first load support assembly 220.

The rail member 252 of the first upwardly extending assembly 224 of the cradle assembly 68 is depicted as a substantially C-shaped member having a first end portion 264, a medial portion 266, and a second end portion 268. The first end portion 264 of the rail member 252 is secured to the first end 258 of the elongated member 250 of the first upwardly extending assembly 224; and the second end portion 268 of the rail member 252 is secured to the medial portion 260 of the elongated member 250 of the first upwardly extending assembly 224 such that the rail member 252 is angularly disposed in an upward, outward direction from the elongated member 250 of the first upwardly extending assembly 224.

The elongated member 254 of the second upwardly extending assembly 226 of the cradle assembly 68 is provided with a first end 270, a medial portion 272, and an opposed second end 274. The opposed second end 274 of the elongated member 254 of the second upward extending assembly 226 is secured to the medial portion 244 of the elongated member 238 of the second load supporting assembly 222, near the first end 242 thereof, so that the elongated member 254 of the second upwardly extending assembly 226 is disposed substantially perpendicular to the elongated member 238 of the second load support assembly 222.

The rail member 256 of the second upwardly extending assembly 226 is depicted as a substantially C-shaped member having a first end portion 276, a medial portion 278, and a second end portion 280. The first end portion 276 of the rail member 256 is secured to the first end 270 of the elongated member 254 of the second upwardly extending assembly 226, and the second end portion 280 of the rail member 256 is secured to the medial portion 272 of the elongated member 254 of the second upwardly extending assembly 226 such that the rail member 256 is angularly disposed, in an upward, outward direction, from the elongated member 254 of the second upwardly extending assembly 226.

The cross suport assembly 248 of the cradle assembly 68 comprises a first gusset 282, a second gusset 284, at least one cross support member 286, and a post 288 mounted on the cross support member 286 for connecting the hydraulic ram 66 to the cradle assembly 68 so that the cradle assembly 68 can be moved between the lowered first position and the raised second position. The first gusset 282, an angular shaped reinforcing member, is provided with a first end 290 and a second end 292. The first end 290 of the first gusset 282 is connected to the first end 232 of the elongated member 228 of the first load supporting assembly 222; and the second end 292 of the first gusset 282 is connected to the medial portion 260 of the elongated member 250 of the first upwardly extending assembly 224 substantially as shown in FIGS. 2, 5, 6, 8 and 9.

The second gusset 284, an angularly shaped reinforcing member, is provided with a first end 294 and a second end 296. The first end 294 of the second gusset 284 is connected to the first end 242 of the elongated member 238 of the second load support assembly 222; and the second end 296 of the second gusset 284 is connected to the medial portion 272 of the elongated member 254 of the second upwardly extending assembly 226 substantially as shown in FIG. 1.

The cross support member 286 is disposed between and connected to the first and second gussets 282, 284 substantially as shown in FIGS. 3 and 7. The post 288 is mounted on a medial portion of the cross support member 286 such that the post 288 extends therefrom in the direction of the forward end portion 53 of the bed 12 of the pickup truck 10. The post 288 is provided with a bore (not shown) which is adapted to receive a pin 298 for pivotally connecting the reciprocating rod portion of the hydraulic ram 66 thereto. The pivotal attachment of the reciprocating rod portion of the hydraulic ram 66 to the cradle assembly 68 via the cross support member 286, the post 288, and the pin 298 can be accomplished by providing a clevis 300 on the end of the reciprocating rod of the hydraulic ram 66. The clevis 300 is provided with a pair of axially aligned bores (not shown) so that when the clevis 300 is positioned on the post 288 of the cradle assembly 68 the bores (not shown) in the clevis 300 of the hydraulic ram 66 are alignable with the bore (not shown) in the post 288 so that the pin 298 can be positioned through the aligned bores of the clevis 300 and the post 288 to pivotally connect the outwardly extending end portion of the reciprocating rod of the hydraulic ram 66 to the cradle assembly 68.

The hydraulic ram 66 can be any suitable hydraulic actuator which is operably connected to a hydraulic source (not shown) for providing hydraulic fluid flow to the hydraulic ram 66 via hydraulic hoses (not shown). Hydraulic rams are well known in the art, as well as their connection to a hydraulic fluid source via hydraulic hoses. Thus, no further description of the hydraulic ram 66 or its connection to a fluid source is believed necessary herein.

As previously stated the cradle assembly 68 is pivotally connected to the support frame 28 such that the cradle assembly 68 is alignable with the frame 22 of the materials handling device 14 and adapted to receive the housing assembly 20, the frame 22, and the housing and frame actuator, such as the hydraulic ram 26, when the cradle assembly 68 is in the lowered first position and the housing assembly 20, the frame 22 and the hydraulic ram 26 are disposed in a position on the bed of the pickup truck 10 substantially as shown in FIGS. 6 and 7.

The pivotable attachment of the cradle assembly 68 to the support frame 28 can be achieved via a pair of linkage members 302 and 304. The linkage member 302, depicted as an elongated member, is provided with a first end 306 and a second end 308. The first end 306 of the first linkage member 302 is connected to the first gusset 282 of the cradle assembly 68 so that the linkage member 302 is disposed between the first gusset 282 and the bed 12 of the pickup truck 10. In other words, the linkage member 302 extends from the first gusset 282 in a forward, downward direction substantially as shown in FIGS. 2, 4, 6 and 11.

The second end 308 of the linkage member 302 is provided with a bore (not shown) extending therethrough which is alignable with a bore (not shown) in the first side member 32 of the support frame 28. A pivot pin 310 is positioned in the aligned bores (not shown) of the second end 308 of the linkage member 302 and the first side member 32 of the support frame 28 to pivotally connect the linkage member 302, and thus the cradle assembly 68, to the first side member 32 of the support assembly 28.

The linkage member 304 is also an elongated member having a first end 312 and a second end 314. The first end 312 of the linkage member 304 is connected to the second gusset 284 of the cradle assembly 68 so that the second linkage member 304 is disposed between the second gusset 284 and the bed 12 of the pickup truck 10. In other words, the linkage member 304 extends from the second gusset 284 forward and downward therefrom.

The second end 314 of the linkage member 304 is provided with a bore (not shown) which is alignable with a bore (not shown) in the second side member 34 of the support frame 28. A pivot pin 316 is positioned in the aligned bores (not shown) of the second end 314 of the linkage member 304 and the second side member 34 of the support frame 28 to pivotally connect the linkage member 304, and thus cradle assembly 68, to the second side member 34 of the support frame 28.

The pivotable connection of the cradle assembly 68 to the first and second side members 32, 34 of the support frame 28 via the linkage members 302, 304 and the pivot pins 310, 316, together with the interconnection of the cradle assembly 68 with the support frame 28 via the hydraulic ram 66, enables the operator of the pickup truck 10 to activate the hydraulic ram 66 from the cab of the pickup truck and selectively move the cradle assembly 68 between the lowered first position (as shown in FIGS. 2, 5, and 6) and the raised second position (as shown in FIGS. 1, 8, 9 and 11).

Referring now to FIG. 11 the cradle assembly 68 is provided with a modified first load support assembly 320 and a parallel, spatially disposed modified second load support assembly (not shown). Since the first load support assembly 320 and the second load support assembly (not shown) are identical in construction only the first load support assembly 320 will be described in detail. Further, it should be noted that the other components of the cradle assembly 68, namely the upward extending assemblies of the cradle assembly 68, such as the first upwardly extending assembly 224, the cross support assembly 248, and the post 288 mounted on the cross support member 286 of the cross support assembly 248 for connecting the hydraulic ram 66 to the cradle assembly 68 are substantially identical in construction and function as has been discussed in detail hereinbefore with reference to FIGS. 1-10. Thus, the interconnection and structural features of such components will not be further described with reference to FIG. 11, except in those instances where same are required to fully describe the modified load support assembly 320 depicted in FIG. 11.

The load support assembly 320 comprises a first elongated member 322, a second elongated member 324, and a substantially normally disposed end member 326. The first elongated member 322 of the load support assembly 320 is provided with a first end 328, a medial portion 330, and an opposed second end 332. The second elongated member 324 of the load support assembly 320 is provided with a first end 334 and an opposed second end 336. The first end 328 of the first elongated member 322 is pivotally connected to the opposed second end 336 of the second elongated member 324 of the load support assembly 320 via a pivot pin 338. Thus, the first and second elongated members 322, 324 of the load support assembly 220 are provided with a substantially common longitudinal axis when the cradle assembly 68 is disposed in the lower first position; or the first elongated member 332 can be moved to a folded position wherein same is disposed between the upwardly extending assemblies, such as upwardly extending assembly 224 of the cradle assembly 68, when the materials handling device 14 is not in use.

Because of the before mentioned pivotal attachment of the first elongated member 332 to the second elongated member 334, it is desirable that the first elongated member 332 be stabilized when the cradle assembly 68, and thus the materials handling device 14, are in use. To stabilize the first elongated member 332 of the load support assembly 320 in the extended, unfolded position as depicted in FIG. 11, a chain 340 having a first end 342 and a second end 344 is disposed between and connected to the first elongated member 332 of the load support assembly 330 and the elongated member 250 of the upwardly extending assembly 224. For example, the first end 242 of the chain 240 can be secured to the first elongated member 332, by any suitable means, such as welding, bolting and the like; and the second end 344 of the chain 340 can be secured to the elongated member 250 of the upwardly extending assembly 224 by any suitable means, such as welding, bolting, and the like. It should be noted, however, that when employing the chain 340 to stabilize and support the first elongated member 332 of the load support assembly 330 the chain 340 should be fully extended when the first elongated member 332 of the load support assembly 330 is disposed in the operable position, i.e. when the elongated axis of the first elongated member 332 is substantially perpendicular to the elongated axis of the elongated member 250 of the upwardly extending assembly 224 of the cradle assembly 68.

The end member 326 of the load support assembly 320 is secured to the opposed second end 332 of the first elongated member 322 such that the longitudinal axis of the end member 328 is substantially normal to the elongated axis of the first elongated member 322. The second elongated member 324 of the cradle assembly 68 is connected to the opposed second end 262 of the elongated member 250 of the first upwardly extending assembly 224 of the cradle assembly 68, near the opposed second end 336 of the second elongated member 324 so that the elongated member 250 of the first upwardly extending assembly 224 is supported by the first elongated member 322 and the elongated member 250 of the first upwardly extending assembly 224 is disposed substantially perpendicular to the second elongated member 334 of the load support assembly 320.

In order to more fully describe the present invention a brief description of the operation of the materials handling device 14 will now be described with reference to certain drawings. When it is desirable to move the materials handling device 14 from one location to another, in an unloaded condition, the hydraulic ram 66 is activated to position the cradle assembly 68 in the lowered first position, and the hydraulic ram 26 is activated to move the housing assembly 20, the frame 22, and the material engaging assembly 24 to the position disposed on the bed 12 of the pickup truck 10 substantially as shown in FIG. 6.

To employ the materials handling device 14 to load material, such as the cylindrical bales of hay, 16, 18 onto the bed 12 of the pickup truck 10, the operator of the vehicle activates the hydraulic ram 26 so that the housing assembly 20 and the frame 22 are moved to the position wherein same are vertically disposed substantially adjacent the rearward end portion 51 of the pickup truck 10. The operator of the vehicle can maintain the frame 22 in the vertically raised position until he has positioned the pickup truck 10 in the desired position for loading the hay bale 16. Once the pickup truck 10 has been positioned in the proper loading position the frame 22 can be selectively lowered towards the vertically lowered position so that the first and second arms 148, 150 of the material engaging assembly 24 can be disposed in close proximity to the ground or loading surface. Thereafter the pickup truck 10 is backed up until the first and second arms 148, 150 are disposed underneath the bale of hay 16.

It should be noted that because of the unique pivotable attachment of the housing assembly 20 and the hydraulic ram 26 of the materials handling device 14 to the support frame 28, as the opposed second ends 154, 158 of the first and second arms 148, 150 engage the bale of hay 16 the housing assembly 20 is caused to pivot slightly in a direction towards the forward end portion 53 of the pickup truck 10. This slight pivotal movement of the housing assembly 20 assists in the loading of the bale of hay 16 onto the first and second arms 148, 150 of the materials handling device 14. The pivotal movement of the housing assembly 20 can continue until the reinforcing plates 180, 200 of the first and second arms 148, 150, respectively, engage the ground. The pivotal movement of the housing assembly 20 as described above prevents the lifting of the rearward end portion 53 of the pickup truck 10 during the loading operations.

Once the bale of hay 16 has been disposed on the first and second arms 148, 150 of the material engaging assembly 24 the operator of the pickup truck 10 activates the hydraulic ram 26 so as to cause the frame 22 to be moved initially to the raised vertical position. Continued activation of the hydraulic ram 26 will then cause the housing assembly 20 and the frame 22 to be pivoted so that same are disposed on the bed 12 of the pickup truck 10. The cradle assembly 68, which has been previously positioned in the lowered first position receives the bale of hay 16 from the material engaging assembly 24. Thereafter, upon activation of the hydraulic ram 66 the operator of the vehicle can pivotally move the cradle assembly 68 from the lowered first position to the second raised position (as depicted in FIGS. 1 and 9).

Once the cradle assembly has been moved to the raised second position, the operator can activate the hydraulic ram 26 so that the housing assembly 20 and the frame 22 are moved to the vertically disposed position adjacent the rearward end portion 51 of the pickup truck 10 and the first and second arms 148, 152 of the material engging assembly 24 can engage a second bale of hay, such as the bale of hay 18 for positioning of the bale of hay on the pickup truck 10 substantially as shown in FIG. 9.

In order to unload the bales of hay 16, 18 the bed 12 of the pickup truct 10 the hydraulic ram 26 is activated to cause the housing assembly and frame 22 to move to the vertical position. During the movement of the housing assembly 20 and the frame 22 to the vertical position the bale of hay 16 is supported on the first and second arms 148, 150 of the material engaging assembly 24. Once the frame 22 has been moved to the vertically disposed lowered position the pickup truck 10 can be driven forward thus leaving the bale of hay 18 on the ground at the desired location.

In order to remove the bale of hay 16 from the cradle 68 of the materials handling device 14, the operator of the vehicle activates the hydraulic ram 26 so as to dispose the housing assembly 20 and the frame 22 of the materials handling device on the bed 12 of the pickup truck 10. Thereafter, the operator activates the hydraulic ram 66 to move the cradle assembly 68 from the raised second position to the lowered first position so that the hay bale 16 is disposed above the housing assembly 20 and the frame 22 of the materials handling device 14. In order to prevent dropping of the bale of hay 16 as the housing assembly 20 and frame 22 are moved to the vertical position as hereinbefore described, the operator can, if desired and required, activate the hydraulic cylinder 66 so that the first and second upwardly extending assemblies 224, 226 are moved a distance rearward of their vertically disposed position to insure that the bale of hay 16 is disposed adjacent the first and second arms 148, 150 of the material engaging assembly 24. It should be noted that if the bale of hay 16 is not properly positioned against the first and second arms 148, 150 of the material engaging assembly 24 during the unloading operation the bale of hay 16 can fall off of the first and second arms 148, 150 of the material engaging assembly 24, or the force created by the bale of hay 16 falling into position on the first and second arms 148, 150 of the material engaging assembly 24 can shear the bolts 186, 206 employed to secure the first and second arms 148, 150 to the second cross support member 124 of the housing assembly 20.

It is clear that the present invention is well adapted to carry out the objects and obtain the ends and advantages mentioned, as well as those inherent therein. While a presently preferred embodiment of the present invention has been described for purposes of this disclosure, numerous changes will be made which will readily suggest themselves to those skilled in the art and which are encompassed within the spirit of the invention disclosed and defined in the appended claims.

We claim:

1. A materials handling device for selectively loading and unloading material on a support structure, the materials handling device adapted for mounting on the support structure and comprising:

a housing assembly pivotally connected to the support structure and disposed substantially adjacent one edge portion of the support structure, the housing assembly movable between a first position wherein the housing assembly is substantially vertically disposed and a second position wherein the housing assembly is substantially horizontally disposed on the support structure;

a frame having a first end portion and a second end portion, the frame slidably positioned within the housing assembly and movable between a vertically lowered position and a vertically raised position;

material engaging means mounted on the first end portion of the frame for engaging and supporting the material as same is selectively loaded and unloaded from the support structure, the material engaging means mounted on the first end portion of the frame so as to extend in a direction away from the support structure; and frame and housing actuator means for selectively moving the frame between the vertically lowered position and the vertically raised position and for selectively moving the housing assembly between the vertically disposed first position and the horizontally disposed second position, the actuator means disposed between and pivotally connected to the support structure and to the second end portion of the frame such that upon activation of the actuator means, when the frame is in the vertically lowered position and the housing assembly is in the first position the frame is movable between the vertically lowered position and the vertically raised position and continued activation of the actuator means selectively moves the housing assembly between the first position and the second position.

2. The materials handling device of claim 1 which further comprises:

cradle means for receiving the material from the frame and the materials engaging means, the cradle means pivotally mounted on and supported by the support structure, the cradle means alignable with the frame and movable between a lowered first position and a raised second position, in the lowered first position the cradle means being adapted to receive the housing assembly, the frames, and the actuator means when the housing assembly is in the second position so that the material engaged and supported by the material engaging means and the frame can be disposed on and supported by the cradle means; and cradle actuator means for selectively moving the cradle between the lowered first position and the raised second position, the cradle actuator means disposed between and pivotally connected to the support structure and to the cradle means such that upon activation of the cradle actuator means, when the cradle means is in the lowered first position, the cradle means is movable between the lowered first position and the raised second position so that the material is supported therein and the housing assembly, the frame, and the material engaging means can unrestrictedly be moved via the frame and housing actuator means between the second position and the first position.

3. The materials handling device of claim 1 or 2 wherein the housing assembly comprises:
- a first tubular member having a first end and an opposed second end; and
- a substantially parallel spatially disposed second tubular member having a first end and an opposed second end, the first ends of the first and second tubular members adapted to engage the first end of the frame to limit the movement of the frame when same is moved to the vertically lowered position, the opposed second ends of the first and second tubular members adapted to engage the second end portion of the frame to limit the movement of the frame when same is moved to the vertically raised position.

4. The materials handling device of claim 3 wherein the housing assembly further comprises pivot means secured to the first and second tubular members for pivotally connecting the first and second tubular members to the support structure.

5. The materials handling device of claim 4 wherein the housing assembly further comprises:
- a first cross support member disposed between and connected to the first ends of the first and second tubular member; and
- a substantially parallel, spatially disposed second cross member disposed between and connected to the opposed second ends of the first and second tubular members.

6. The materials handling device of claim 3 wherein the frame comprises:
- a first side member having a first end portion and a second end portion, the first side member being slidably positioned in the first tubular member of the housing assembly such that the first end portion of the first side member extends a distance from the first end of the first tubular member and the second end of the first side member extends a distance from the opposed second end portion of the first tubular member;
- a second side member having a first end portion and a second end portion, the second side member being slidably positioned in the second tubular member such that the first end of the second side member extends a distance from the first end of the second tubular member and the second end of the second side member extends a distance from the opposed second end portion of the second tubular member;
- a first cross support member disposed between and connected to the first end portions of the first and second side members of the frame;
- a second cross support member having a first end portion, a medial portion and an opposed second end portion, the first ends of the first and second side members of the frames being secured to the medial portion of the second cross support member such that the first end portion of the second cross support member extends a distance from the first side member and the opposed second end portion of the second cross support member extends a distance from the second side member of the frame.

7. The materials handling device of claim 6 wherein the materials engaging means comprises:
- an elongated arm having a first end and an opposed second end, the first end of the first arm being adjustably connected to the first end portion of the second cross support member such that the first arm extends therefrom in a direction away from the support structure; and
- an elongated second arm having a first end and an opposed second end, the first end of the second arm member being adjustably connected to the opposed second end portion of the second cross support member such that the second arm extends away from the support structure in a direction substantially parallel to the first arm.

8. The materials handling device of claim 7 wherein the second cross support member of the frame is a tubular member and the materials engaging means further comprises:
- a first telescoping member having a first end and a second end, the second end of the first telescoping member being positionable within the first end portion of the second cross support member such that the distance between the first and second arms can be extended, the first end of the first telescoping member being connected to the first end of the first arm; and
- first connecting means for securing the second end of the first telescoping member in a selected position in the first end portion of the second cross support member.

9. The materials handling device of claim 8 wherein the materials engaging means further comprises:
- a second telescoping member having a first end and a second end, the second end of the second telescoping member being positionable within the opposed second end portion of the second cross support member such that the distance between the first and second arms can be extended, the first end of the second telescoping member being connected to the first end of the second arm; and
- second connecting means for securing the second end of the second telescoping member in a selected position in the second end portion of the second cross support member.

10. The materials handling device of claim 9 which further comprises:
- a first reinforcing plate secured to the first end of the first telescoping member such that the elongated axis of the first telescoping member is substantially perpendicular to the plane of the first reinforcing plate;
- a second reinforcing plate secured to the first end of the first arm, the second reinforcing plate being disposed substantially adjacent the first reinforcing plate;
- first plate connecting means for securing the first reinforcing plate to the second reinforcing plate;
- a third reinforcing plate secured to the first end of the second telescoping member such that the elongated axis of the second telescoping member is substantially perpendicular to the plane of the third reinforcing plate;
- a fourth reinforcing plate secured to the first end of the second arm, the fourth reinforcing plate being disposed substantially adjacent the third reinforcing plate; and
- second plate connecting means for securing the third reinforcing plate to the fourth reinforcing plate.

11. The materials handling device of claim 10 wherein each of the reinforcing plates is provided with a plurality of apertures in their peripheral edge portions, and the first and second plate connecting means comprises a plurality of bolts disposed through the aligned apertures in the reinforcing plates disposed adjacent and abutting one another, the bolts being secured therein to secure the abutting first and second reinforcing plates together, and to secure the abutting third and fourth reinforcing plates together.

12. The materials handling device of claim 9 wherein the first and opposed second end portions of the second cross member of the frame are provided with at least one aperture therein, the second end of each of the first and second telescoping members is provided with a plurality of bores therein, the first connecting means for securing the first telescoping member in the first end portion of the second cross support member comprises a bolt positionable within the aligned aperture of the first end portion of the second cross support member and a selected bore in the second end of the first telescoping member, and the second connecting means for securing the second telescoping member in the opposed second end portion of the second cross support member of the frame comprises a bolt positionable within the aligned aperture of the opposed second end portion of the second cross support member and a selected bore in the second end of the second telescoping member.

13. The materials handling device of claim 1 wherein the frame and housing actuator means is an hydraulic ram having a base end portion and a reciprocating rod end portion, the reciprocating rod end portion being pivotally connected to the first cross support member of the frame, the base portion of the hydraulic ram being pivotally connected to the support structure.

14. The materials handling device of claim 6 which further comprises a first stop means operably disposed on the first side member of the frame for engaging the opposed second end of the first tubular member of the housing assembly to restrict the movement of the frame when same is moved to the vertically raised position, the first stop means being disposed on the first side member a preselected distance from the second end portion thereof.

15. The materials handling device of claim 14 which further comprises a second stop means operably disposed on the second side member of the frame for engaging the opposed second end of the second tubular member of the housing assembly to limit the movement of the frame when same is moved to the vertically raised position, the second stop means being disposed on the second side member of the frame a preselected distance from the second end portion of the second side member.

16. The materials handling device of claim 2 wherein the cradle means comprises:
a first load support member having a first end, a medial portion, and an opposed second end;
a substantially parallel, spatially disposed second load support member having a first end, a medial portion and an opposed second end;
first pivot means for pivotally connecting the first and second load support member to the support structure such that the opposed second ends of the first and second load support members are disposed substantially adjacent the one edge portion of the structure and the first and second load support members, when in the lowered first position, are adapted to receive therebetween the housing assembly, the frame and the actuator means when same are in the second position;
a first upwardly extending member having a first end, a medial portion, and an opposed second end, the opposed second end of the first upwardly extending member being connected to the medial portion of the first load support member, near the first end thereof, such that the first upwardly extending member is disposed substantially perpendicular to the first load support member;
a substantially parallel, spatially disposed second upwardly extending member having a first end, a medial portion, and an opposed second end, the opposed second end of the second upwardly extending member being connected to the medial portion of the second load support member, near the first end thereof, such that the second upwardly extending member is disposed substantially perpendicular to the second load support member;
cross support means operably connected to the first and second load support members and the first and second upwardly extending members to interconnect and reinforce same; and
second pivot means for pivotally connecting the cradle actuator to the cross support means.

17. The materials handling device of claim 16 wherein the first load support member of the cradle means comprises:
a first elongated member having a first end, a medial portion, and an opposed second end;
a second elongated member having a first end and an opposed second end; and
pivot means for pivotally connecting the first end of the first elongated member of the first load support member to the opposed second end of the second elongated member so as to provide the first and second elongated members with a substantially common longitudinal axis when the cradle means is disposed in the lowered first position, the first upwardly extending member of the cradle means being connected to the second elongated member in close proximity to the opposed second end of the second elongated member; and
wherein the second load support member of the cradle means comprises:
a first elongated member having a first end, a medial portion, and an opposed second end,
a second elongated member having a first end and an opposed second end; and
pivot means for pivotally connecting the first end of the first elongated member to the opposed second end of the second elongated member so as to provide the first and second elongated member of the second load support member with a substantially common longitudinal axis when the cradle means is disposed in the lowered first position, the second upwardly extending member of the cradle means being connected to the second elongated member in close proximity to the opposed second end of the second elongated member.

18. The materials handling device of claim 16 wherein the cradle means further comprises:
a first rail member having a first end portion, a medial portion, and a second end portion, the first end portion of the first rail member being secured to the first end of the first upwardly extending member, the second end portion of the first rail member being secured to the medial portion of the first upwardly extending member such that the medial portion of the first rail member is angularly disposed in an upward, outward direction from the first upwardly extending member and;

a second rail member having a first end portion, a medial portion, and a second end portion, the first end portion of the second rail member being secured to the first end of the second upwardly extending member, the second end portion of the second rail member being secured to the medial portion of the second upwardly extending member such that the medial portion of the second rail member is angularly disposed in an upward, outward direction from the second upwardly extending member.

19. The mateials handling device of claim 18 wherein the cradle assembly further comprises:

a first end member secured to the opposed second end of the first load support member such that the first end member is disposed substantially normal to the elongated axis of the first load support member; and a second end member secured to the opposed second end of the second load support member such that the second end member is disposed substantially normal to the elongated axis of the second load support member.

20. The materials handling device of claim 16 wherein the cross support means of the cradle means comprises:

a first gusset having a first end and a second end, the first end of the first gusset being connected to the first end of the first load supporting member, the second end of the gusset being connected to the medial portion of the first upwardly extending member;

a second gusset having a first end and a second end, the first end of the second gusset being connected to the first end of the second load supporting member, the second end of the gusset being connected to the medial portion of the second upwardly extending member; and at least one cross support member disposed between and connected to the first and second gussets.

21. The materials handling device of claim 20 wherein the first pivot means comprises:

a first linkage member having a first end and a second end, the first end of the first linkage member being secured to the first gusset such that the first linkage member extends in a downward direction therefrom and is disposed between the first gusset and the support structure, the second end of the first linkage member being pivotally connected to the support structure; and a second linkage member having a first end and a second end, the first end of the second linkage member being connected to the second gusset such that the second linkage member extends in a downward direction therefrom and is disposed between the second gusset and the support structure, the second end of the second linkage member being pivotally connected to the support structure.

22. The materials handling device of claim 20 wherein the cradle actuator means is a hydraulic ram having a base end portion and a reciprocating rod end portion, the reciprocating rod end portion being pivotally connected to the cross support member of the cross support means, the base portion of the hydraulic ram being connected to the support structure such that the hydraulic ram is angularly disposed with respect to the support structure.

23. The materials handling device of claim 17 wherein the cradle means further comprises:

a first rail member having a first end portion, a medial portion, and a second end portion, the first end portion of the first rail member being secured to the first end of the first upwardly extending member and the second end portion of the first rail member being secured to the medial portion of the first upwardly extending member such that the medial portion of the first rail member is angularly disposed in an upward, outward direction from the first upwardly extending member; and a second rail member having a first end portion, a medial portion, and a second end portion, the first end portion of the second rail member being secured to the first end of the second upwardly extending member and the second end portion of the second rail member being secured to the medial portion of the second upwardly extending member such that the medial portion of the second rail member is angularly disposed in an upward, outward direction from the second upwardly extending member.

24. The materials handling device of claim 23 wherein the cradle assembly further comprises:

a first end member secured to the opposed second end of the first elongated member of the first load support member such that the first end member is substantially normal to the elongated axis of the first elongated member of the first load support member; and a second end member secured to the opposed second end of the first elongated member of the second load support member such that the second end member is disposed normal to the elongated axis of the first elongated member of the second load support member.

25. An implement for selectively loading and unloading cylindrical bales of hay on to a load supporting bed of a vehicle, the vehicle having a rearward end portion and a forward end portion, the implement comprising:

a support frame mounted on the load supporting bed of the vehicle on the support frame having a first end portion and an opposed second end portion, the opposed second end portion of the frame support being disposed substantially adjacent the rearward end portion of the vehicle;

a housing assembly pivotally connected to the opposed second end portion support frame and disposed substantially adjacent the rearward end portion of the vehicle, the housing assembly movable between a first position wherein the housing assembly is substantially vertically disposed and a second position wherein the housing assembly is substantially horizontally disposed on the load supporting bed of the vehicle;

a frame having a first end portion and a second end portion, the frame slidably positioned within the housing assembly and movable between a vertically lowered position and a vertically raised position;

material engaging means mounted on the first end portion of the frame for engaging and supporting the material as same is selectively loaded and unloaded from the load supporting bed of the vehicle, the material engaging means mounted on the first end portion of the frame so as to extend in a direction away from the rearward end portion of the vehicle; and frame and housing actuator means for selectively moving the frame between the vertically lowered position for selectively moving the housing assembly between the vertically disposed first position and the horizontally disposed second position, the actuator means disposed between and pivotally connected to the support frame and to the second end portion of the frame such that upon activation of the actuator means, when the frame is in the vertically lowered position and the housing assembly is in the first position, the frame is movable between the vertically lowered position and the vertically raised position and continued activation of the actuator means selectively moves the housing assembly between the first position and the second position.

26. The implement of claim 25 which further comprises:
cradle means for receiving the material from the frame and the materials engaging means, the cradle means pivotally connected to the first end portion of the support frame, the cradle means being positioned a selected distance from the housing pivotally connected to the opposed second end of the support frame, the cradle means being alignable with the frame and movable between a lowered first position and a raised second position, in the lowered first position the cradle means being adapted to receive the housing assembly, the frames, and the actuator means when the housing assembly is in the second position so that the material engaged and supported by the material engaging means and the frame can be disposed on and supported by the cradle means; and
cradle actuator means for selectively moving the cradle between the lowered first position and the raised second position, the cradle actuator means disposed between and pivotally connected to the first end portion of the support frame and to the cradle means such that upon activation of the cradle actuator means, when the cradle means is in the lowered first position, the cradle means is movable between the lowered first position and the raised second position so that the material is supported therein and the housing assembly, the frame, and the material engaging means can unrestrictedly be moved via the frame and housing actuator means between the second position and the first position.

27. The implement of claim 26 wherein the support frame comprises:
a first side member having a first end, a medial portion, and an opposed second end; and
a substantially parallel, spatially disposed second side member having a first end, a medial portion and an opposed second end, the first and second side member being connected to the load supporting bed of the vehicle such that the first end of each of the first and second side members is disposed near the forward end portion of the load supporting bed and the opposed second end of each of the first and second side members is disposed substantially adjacent the rearward end portion of the load supporting bed.

28. The implement of claim 27 wherein the support frame further comprises:

a first cross support member disposed between and connected to the first ends of the first and second side members; and
a second cross support member disposed between and connected to the opposed second ends of the first and second side members.

29. The implement of claim 25 or 26 wherein the housing assembly comprises:
a first tubular member having a first end and an opposed second end; and
a substantially parallel spatially disposed second tubular member having a first end and an opposed second end, the first ends of the first and second tubular members adapted to engage the first end of the frame to limit the movement of the frame when same is moved to the vertically lowered position, the opposed second ends of the first and second tubular members adapted to engage the second end portion of the frame to limit the movement of the frame when same is moved to the vertically raised position.

30. The implement of claim 29 wherein the housing assembly further comprises pivot means secured to the first and second tubular members for pivotally connecting the first and second tubular members to the first and second side members of the support frame.

31. The implement of claim 30 wherein the housing assembly further comprises:
a first cross support member disposed between and connected to the first ends of the first and second tubular member; and
a substantially parallel, spatially disposed second cross member disposed between and connected to the opposed second ends of the first and second tubular members.

32. The implement of claim 30 wherein the frame comprises:
a first side member having a first end portion and a second end portion, the first side member being slideably positioned in the first tubular member of the housing assembly such that the first end portion of the first side member extends a distance from the first end of the first tubular member and the second end of the first side member extends a distance from the opposed second end portion of the first tubular member;
a second side member having a first end portion and a second end portion, the second side member being slideably positioned in the second tubular member such that the first end of the second side member extends a distance from the first end of the second tubular member and the second end of the second side member extends a distance from the opposed second end portion of the second tubular member;
a first cross support member disposed between and connected to the first end portions of the first and second side members of the frame; and
a second cross support member having a first end portion, a medial portion and an opposed second end portion, the second ends of the first and second side members of the frames being secured to the medial portion of the second cross support member such that the first end portion of the second cross support member extends a distance from the first side member and the opposed second end portion of the second cross support member extends a distance from the second side member of the frame.

33. The implement of claim 32 wherein the materials engaging means comprises:
- a first arm having a first end and an opposed second end, the first end of the first arm being adjustably connected to the first end portion of the second cross support member such that the first arm extends therefrom in a direction away from the vehicle; and
- a second arm having a first end and an opposed second end, the first end portion of the second arm member being adjustably connected to the opposed second end portion of the second cross support member such that the second arm extends away from the vehicle in a direction substantially parallel to the first arm.

34. The implement of claim 33 wherein the second cross support member of the frame is a tubular member and the materials engaging means further comprises:
- a first telescoping member having a first end and a second end, the second end of the first telescoping member being positionable within the first end portion of the second cross support member such that the distance between the first and second arms can be extended, the first end of the first telescoping member being connected to the first end of the first arm; and
- first connecting means for securing the second end of the first telescoping member in a selected position in the first end portion of the second cross support member.

35. The implement of claim 34 wherein the materials engaging means further comprises:
- a second telescoping member having a first end and a second end, the second end of the second telescoping member being positionable within the opposed second end portion of the second cross support member such that the distance between the first and second arms can be extended, the first end of the second telescoping member being connected to the first end of the second arm; and
- second connecting means for securing the second end of the second telescoping member in a selected position in the second end portion of the second cross support member.

36. The implement of claim 35 which further comprises:
- a first reinforcing plate secured to the first end of the first telescoping member such that the elongated axis of the first telescoping member is substantially perpendicular to the plane of the first reinforcing plate;
- a second reinforcing plate secured to the first end of the first arm, the second reinforcing plate being disposed substantially adjacent the first reinforcing plate;
- first plate connecting means for securing the first reinforcing plate to the second reinforcing plate;
- a third reinforcing plate secured to the first end of the second telescoping member such that the elongated axis of the second telescoping member is substantially perpendicular to the plane of the third reinforcing plate;
- a fourth reinforcing plate secured to the first end of the second arm, the fourth reinforcing plate being disposed substantially adjacent the third reinforcing plate; and
- second plate connecting means for securing the third reinforcing plate to the fourth reinforcing plate.

37. The implement of claim 36 wherein each of the reinforcing plates is provided with a plurality of apertures in their peripheral edge portions, and the first and second plate connecting means comprises a plurality of bolts disposed through the aligned apertures in the reinforcing plates disposed adjacent and abutting one another, the bolts being secured therein to secure the abutting first and second reinforcing plates together, and to secure the abutting third and fourth reinforcing plates together.

38. The implement of claim 35 wherein the first and opposed second end portions of the second cross member of the frame are provided with at least one aperture therein, the second end portion of each of the first and second telescoping members is provided with a plurality of bores therein, the first connecting means for securing the first telescoping member in the first end portion of the second cross support member comprises a bolt positionable within the aligned aperture of the first end portion of the second cross support member and a selected bore in the second end of the first telescoping member, and the second connecting means for securing the second telescoping member in the opposed second end portion of the second cross support member of the frame comprises a bolt positionable within the aligned aperture of the opposed second end portion of the second cross support member and a selected bore in the second end of the second telescoping member.

39. The implement of claim 25 wherein the frame and housing actuator means is an hydraulic ram having a base end portion and a reciprocating rod end portion, the reciprocating rod end portion being pivotally connected to the first cross support member of the frame, the base portion of the hydraulic ram being pivotally connected to the opposed second end portion of the support frame.

40. The implement of claim 32 which further comprises a first stop means operably disposed on the first side member of the frame for engaging the opposed second end of the first tubular member of the housing assembly to restrict the movement of the frame when same is moved to the vertically raised position, the first stop means being disposed on the first side member a preselected distance from the opposed second end portion thereof.

41. The implement of claim 40 which further comprises a second stop means operably disposed on the second side member of the frame for engaging the opposed second end of the second tubular member of the housing assembly to limit the movement of the frame when same is moved to the vertically raised position, the second stop means being disposed on the second side member of the frame a preselected distance from the second end portion of the second side member.

42. The implement of claim 26 wherein the cradle means comprises:
- a first load support member having a first end, a medial portion, and an opposed second end;
- a substantially parallel, spatially disposed second load support member having a first end, a medial portion and an opposed second end;
- first pivot means for pivotally connecting the first and second load support member to the support frame such that the opposed second ends of the first and second load support members are disposed substantially adjacent the rearward end portion of the vehicle and the first and second load support members, when in the lowered first position, are adapted to receive therebetween the housing assembly, the frame and the actuator means when same are in the second position;

a first upwardly extending member having a first end, a medial portion, and an opposed second end, the opposed second end of the first upwardly extending member being connected to the medial portion of the first load support member, near the first end thereof, such that the first upwardly extending member is disposed substantially perpendicular to the first load support member;

a substantially parallel, spatially disposed second upwardly extending member having a first end, a medial portion, and an opposed second end, the opposed second end of the second upwardly extending member being connected to the medial portion of the second load support member, near the first end thereof, such that the second upwardly extending member is disposed substantially perpendicular to the second load support member;

cross support means operably connected to the first and second load support members and the first and second upwardly extending members to interconnect and reinforce same; and second pivot means for pivotally connecting the cradle actuator to the cross support means.

43. The implement of claim 42 wherein the first load support member of the cradle means comprises:

a first elongated member having a first end, a medial portion, and an opposed second end;

a second elongated member having a first end and an opposed second end; and pivot means for pivotally connecting the first end of the first elongated member of the first load support member to the opposed second end of the second elongated member so as to provide the first and second elongated members with a substantially common longitudinal axis when the cradle means is disposed in the lowered first position, the first upwardly extending member of the cradle means being connected to the second elongated member in close proximity to the opposed second end of the second elongated member; and wherein the second load support member of the cradle means comprises:

a first elongated member having a first end, a medial portion, and an opposed second end;

a second elongated member having a first end and an opposed second end; and pivot means for pivotally connecting the first end of the first elongated member to the opposed second end of the second elongated member so as to provide the first and second elongated member of the second load support member with a substantially common longitudinal axis when the cradle means is disposed in the lowered first position, the second upwardly extending member of the cradle means being connected to the second elongated member in close proximity to the opposed second end of the second elongated member.

44. The implement of claim 42 wherein the cradle means further comprises:

a first rail member having a first end portion, a medial portion, and a second end portion, the first end portion of the first rail member being secured to the first end of the first upwardly extending member, the second end portion of the first rail member being secured to the medial portion of the first upwardly extending member such that the medial portion of the first rail member is angularly disposed in an upward, outward direction from the first upwardly extending member, and;

a second rail member having a first end portion, a medial portion, and a second end portion, the first end portion of the second rail member being secured to the first end of the second upwardly extending member, the second end portion of the second rail member being secured to the medial portion of the second upwardly extending member such that the medial portion of the second rail member is angularly disposed in an upward, outward direction from the second upwardly extending member.

45. The implement of claim 44 wherein the cradle assembly further comprises:

a first end member secured to the opposed second end of the first load support member such that the first end member is disposed substantially normal to the elongated axis of the first load support member; and a second end member secured to the opposed second end of the second load support member such that the second end member is disposed substantially normal to the elongated axis of the second load support member.

46. The implement of claim 42 wherein the cross support means of the cradle means comprises:

a first gusset having a first end and a second end, the first end of the first gusset being connected to the first end of the first load supporting member, the second end of the gusset being connected to the medial portion of the first upwardly extending member;

a second gusset having a first end and a second end, the first end of the second gusset being connected to the first end of the second load supporting member, the second end of the gusset being connected to the medial portion of the second upwardly extending member; and at least one cross support member disposed between and connected to the first and second gussets.

47. The implement of claim 46 wherein the first pivot means comprises:

a first linkage member having a first end and a second end, the first end of the first linkage member being secured to the first gusset such that the first linkage member extends in a downward direction therefrom and is disposed between the first gusset and the first side member of the support frame, the second end of the first linkage member being pivotally connected to the first side member of the support frame; and a second linkage member having a first end and a second end, the first end of the second linkage member being connected to the second gusset such that the second linkage member extends in a downward direction therefrom and is disposed between the second gusset and the second side member of the support frame, the second end of the second linkage member being pivotally connected to the second side member of the support frame.

48. The implement of claim 47 wherein the cradle actuator means is a hydraulic ram having a base end portion and a reciprocating rod end portion, the reciprocating rod end portion being pivotally connected to the cross support member of the cross support means, the base portion of the hydraulic ram being connected to the first end portion of the support frame such that the hydraulic ram is angularly disposed with respect to the load supporting bed of the vehicle.

49. The implement of claim 43 wherein the cradle means further comprises:
a first rail member having a first end portion, a medial portion, and a second end portion, the first end portion of the first rail member being secured to the first end of the first upwardly extending member and the second end portion of the first rail member being secured to the medial portion of the first upwardly extending member such that the medial portion of the first rail member is angularly disposed in an upward, outward direction from the first upwardly extending member; and
a second rail member having a first end portion, a medial portion, and a second end portion, the first end portion of the second rail member being secured to the first end of the second upwardly extending member and the second end portion of the second rail member being secured to the medial portion of the second upwardly extending member such that the medial portion of the second rail member is angularly disposed in an upward, outward direction from the second upwardly extending member.

50. The implement of claim 49 wherein the cradle assembly further comprises:
a first end member secured to the opposed second end of the first elongated member of the first load support member such that the first end member is substantially normal to the elongated axis of the first elongated member of the first load support member; and
a second end member secured to the opposed second end of the first elongated member of the second load support member such that the second end member is disposed normal to the elongated axis of the first elongated member of the second load support member.

51. The implement of claim 27 wherein the support frame further comprises:
a first cradle support member mounted on the medial portion of the first side member; and
a second cradle support member mounted on the medial portion of the second side member, the first and second cradle support members cooperating to receive and support the cradle means when same is in the lowered first position.

* * * * *

UNITED STATES PATENT AND TRADEMARK OFFICE
CERTIFICATE OF CORRECTION

PATENT NO. : 4,325,666
DATED : April 20, 1982
INVENTOR(S) : Franklin O. Chain and John P. Myers It is certified that error appears in the above-identified patent and that said Letters Patent are hereby corrected as shown below:

Column 2, line 8, "an" should be --and--.

Column 2, line 31, "a" should be --the--.

Column 5, line 2, "a" should be --as--.

Column 5, line 33, "7" should be --70--.

Signed and Sealed this

Second Day of November 1982

[SEAL]

Attest:

GERALD J. MOSSINGHOFF

*Attesting Officer*     *Commissioner of Patents and Trademarks*